United States Patent
Jafri et al.

(10) Patent No.: US 9,378,153 B2
(45) Date of Patent: Jun. 28, 2016

(54) EARLY WRITE-BACK OF MODIFIED DATA IN A CACHE MEMORY

(71) Applicant: Advanced Micro Devices, Inc., Sunnyvale, CA (US)

(72) Inventors: Syed Ali Jafri, Sunnyvale, CA (US); Yasuko Eckert, Kirkland, WA (US); Srilatha Manne, Portland, OR (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 233 days.

(21) Appl. No.: 14/011,616

(22) Filed: Aug. 27, 2013

(65) Prior Publication Data
US 2015/0067266 A1  Mar. 5, 2015

(51) Int. Cl.
G06F 12/12 (2016.01)
G06F 12/08 (2016.01)

(52) U.S. Cl.
CPC .......... G06F 12/127 (2013.01); G06F 12/0804 (2013.01); *G06F 12/123* (2013.01); *Y02B 60/1225* (2013.01)

(58) Field of Classification Search
None
See application file for complete search history.

(56) References Cited

U.S. PATENT DOCUMENTS 6,502,171 B1 * 12/2002 Arimilli et al. ............... 711/146
7,861,041 B2    12/2010 Williams
2006/0143396 A1 *  6/2006 Cabot .......................... 711/134
2013/0166846 A1 *  6/2013 Gaur et al. ................... 711/122
2014/0237186 A1 *  8/2014 Cox et al. .................... 711/122

OTHER PUBLICATIONS

Aamer Jaleel et al., "Achieving Non-Inclusive Cache Performance with Inclusive Caches", 12 pages, 43$^{rd}$ Annual IEEE/ACM International Symposium on Microarchitecture, 2010.
Manu Awasthi et al., "Efficient Scrub Mechanisms for Error-Prone Emerging Memories", 12 pages, 18$^{th}$ IEEE International Symposium on High Performance Computer Architecture (HPCA), 2012.
Vivek Seshadri et al., "The Evicted-Address Filter: A Unified Mechanism to Address Both Cache Pollution and Thrashing", 12 pages, 21$^{st}$ International Conference on Parallel Architectures and Compilation Technique, 2012.
Aamer Jaleel et al., "High Performance Cache Replacement Using Re-Reference Interval Prediction (RRIP)", 12 pages, 37$^{th}$ Annual International Symposium on Computer Architecture, 2010.
Zhe Wang et al., "Improving Writeback Efficiency with Decoupled Last-Write Prediction", 12 pages, 39$^{th}$ Annual ACM/IEEE International Symposium on Computer Architecture, Jun. 2012.
Mainak Chaudhuri et al., "Introducing Hierarchy-awareness in Replacement and Bypass Algorithms for Last-Level Caches", 12 pages, 21$^{st}$ International Conference on Parallel Architecture and Compilation Techniques, 2012.

(Continued)

*Primary Examiner* — Daniel Tsui
(74) *Attorney, Agent, or Firm* — Park, Vaughan, Fleming & Dowler LLP

(57) ABSTRACT

A level of cache memory receives modified data from a higher level of cache memory. A set of cache lines with an index associated with the modified data is identified. The modified data is stored in the set in a cache line with an eviction priority that is at least as high as an eviction priority, before the modified data is stored, of an unmodified cache line with a highest eviction priority among unmodified cache lines in the set.

19 Claims, 7 Drawing Sheets

(56) References Cited

OTHER PUBLICATIONS

Hsien-Hsin S. Lee et al., "Improving Bandwidth Utilization Using Eager Writeback", 22 pages, Journal of Instruction-Level Parallelism 3, 2001.

Jonathan D. Kron et al., "Double-DIP: Augmenting DIP with Adaptive Promotion Policies to Manage Shared L2 Caches", 9 pages, 2nd workshop on CMP Memory Systems and Interconnects (CMP-MSI), Jun. 2008.

Carole-Jean Wu et al., "PACMan: Perfetch-Aware Cache Management for High Performance Caching", 12 pages, 44th Annual IEEE/ACM International Symposium on Microarchitecture, 2011.

Moinuddin K. Qureshi et al., "Set-Dueling-Controlled Adaptive Insertion for High-Performance Caching", 8 pages, IEEE Computer Society, 2008.

Jeffrey Stuecheli et al., "The Virtual Write Queue: Coordinating DRAM and Last-Level Cache Policies", 11 pages, 37th Annual International Symposium on Computer Architecture, 2010.

* cited by examiner

Recency-of-Usage Table 400

404-0 404-1 404-2 404-3 404-4 404-5 404-6 404-7

| MRU | | | | | | | LRU | 402
| MRU | | | | | | | LRU | 402

FIG. 4A

Entry 420 in Status Table 210

| Status (424) | 2nd-Chance Bit (426) |

FIG. 4B

EARLY WRITE-BACK OF MODIFIED DATA IN A CACHE MEMORY

TECHNICAL FIELD

The present embodiments relate generally to cache memory, and more specifically to write-back of modified data in a cache memory.

BACKGROUND

A processor will flush each level of cache memory before entering a low-power mode (e.g., a sleep mode). This flush prevents losing recently modified data during the low-power mode. To perform this flush, each level of cache memory is walked and modified data is written back to main memory. The time and power associated with performing this flush are overhead that limits the power savings provided by entering the low-power mode for brief periods of time. Accordingly, there is a need for techniques that reduce the number of modified cache lines in a level of cache memory.

SUMMARY OF ONE OR MORE EMBODIMENTS

Embodiments are disclosed in which modified data is placed in a cache line at or near a position of highest eviction priority in a set.

In some embodiments, a method of managing cache memory is performed in a particular level of cache memory. In the method, modified data is received from a higher level of cache memory. A set of cache lines with an index associated with the modified data is identified. The modified data is stored in the set in a cache line with an eviction priority that is at least as high as an eviction priority, before the modified data is stored, of an unmodified cache line with a highest eviction priority among unmodified cache lines in the set.

In some embodiments, a system includes a cache controller to be coupled to a cache data array in a particular level of cache memory. The cache controller is to write modified data from a higher level of cache memory to a cache line in a set of cache lines in the cache data array. The cache line has an eviction priority at least as high as an eviction priority, before the modified data is written, of an unmodified cache line with a highest eviction priority among unmodified cache lines in the set. The set has an index associated with the modified data.

BRIEF DESCRIPTION OF THE DRAWINGS

The present embodiments are illustrated by way of example and are not intended to be limited by the figures of the accompanying drawings.

FIG. 4A shows a data structure for a recency-of-usage table in a cache controller in accordance with some embodiments.

FIG. 4B shows a data structure for an entry in a cache line status table in a cache controller in accordance with some embodiments.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
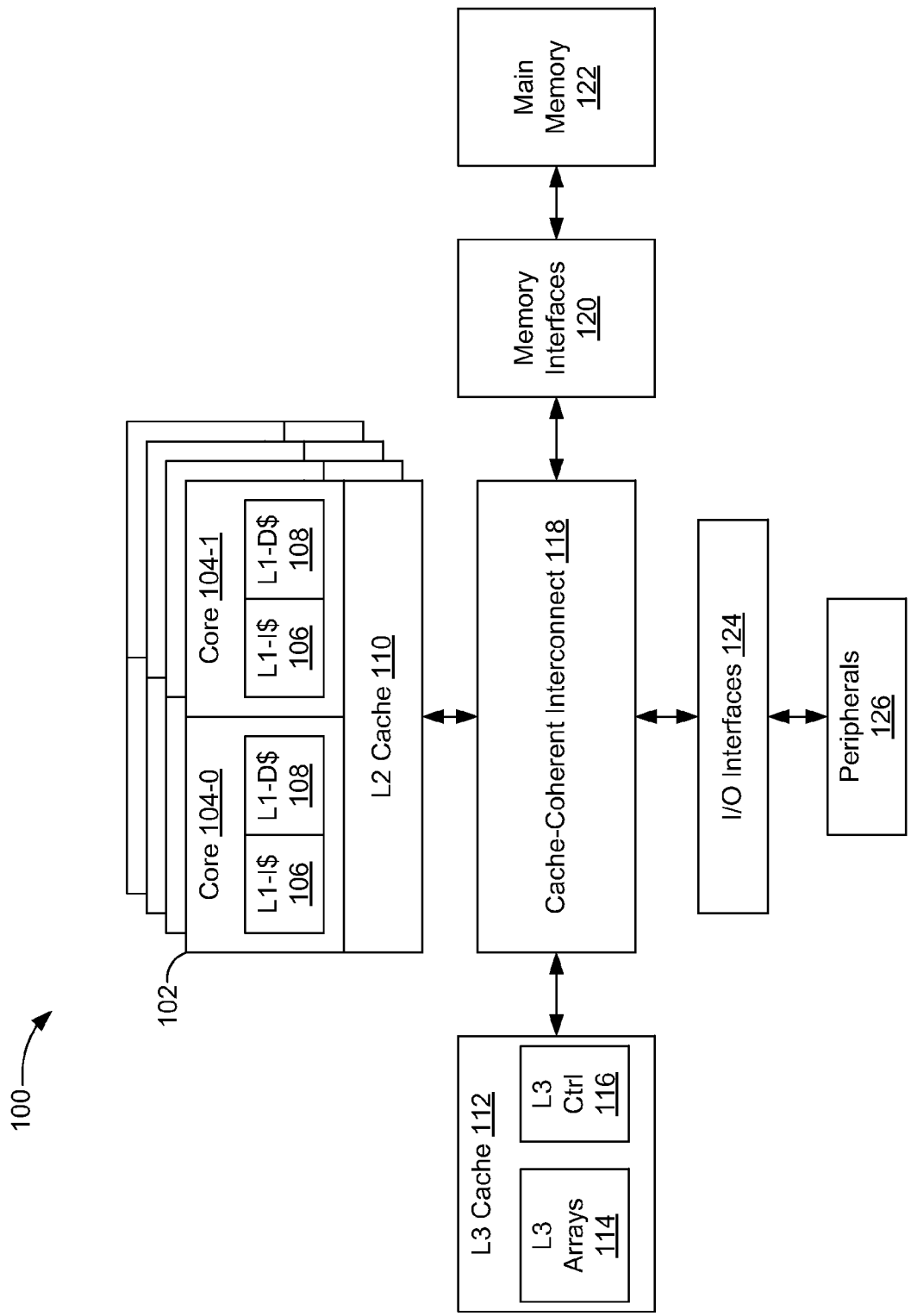
FIG. 1 is a block diagram showing a system in accordance with some embodiments.

FIG. 1 is a block diagram showing a system 100 in accordance with some embodiments. The system 100 includes a plurality of processing modules 102 (e.g., four processing modules 102), each of which includes a first processor core 104-0 and a second processor core 104-1. Processor cores 104 may include one or more central processing unit (CPU) cores, graphics processing units (GPU) cores, digital signal processing (DSP) cores and the like. Each of the processor cores 104-0 and 104-1 includes a level 1 instruction cache memory (L1-I$) 106 to cache instructions to be executed by the corresponding processor core 104-0 or 104-1 and a level 1 data cache (L1-D$) memory 108 to store data to be referenced by the corresponding processor core 104-0 or 104-1 when executing instructions. A level 2 (L2) cache memory 110 is shared between the two processor cores 104-0 and 104-1 on each processing module 102.

A cache-coherent interconnect 118 couples the L2 cache memories 110 (or L2 caches 110, for short) on the processing modules 102 to a level 3 (L3) cache memory 112. The L3 cache 112 includes L3 memory arrays 114 to store information (e.g., data and instructions) cached in the L3 cache 112. Associated with the L3 cache 112 is an L3 cache controller (L3 Ctrl) 116. (The L1 caches 106 and 108 and L2 caches 110 also include memory arrays and have associated cache controllers, which are not shown in FIG. 1 for simplicity.)

In the example of FIG. 1, the L3 cache 112 is the lowest-level cache memory in the system 100 and is therefore referred to as the lowest-level cache or last-level cache (LLC). In other examples, a memory system may include an LLC below the L3 cache 112. In some embodiments, the L1 caches 106 and 108, L2 caches 110, and L3 cache 112 are implemented using static random-access memory (SRAM).

In addition to coupling the L2 caches 110 to the L3 cache 112, the cache-coherent interconnect 118 maintains cache coherency throughout the system 100. The cache-coherent interconnect 118 is also coupled to main memory 122 through memory interfaces 120. In some embodiments, the main memory 122 is implemented using dynamic random-access memory (DRAM). In some embodiments, the memory interfaces 120 coupling the cache-coherent interconnect 118 to the main memory 122 are double-data-rate (DDR) interfaces.

The cache-coherent interconnect 118 is also connected to input/output (I/O) interfaces 124, which allow the cache-coherent interconnect 118, and through it the processing modules 102 and main memory 122, to be coupled to peripheral devices 126.

The L1 caches 106 and 108, L2 caches 110, L3 cache 112, and main memory 122 form a memory hierarchy in the system 100. Each level of this hierarchy has less storage capacity but faster access time than the level below it: the L1 caches 106 and 108 offer less storage but faster access than the L2 caches 110, which offer less storage but faster access than the L3 cache 112, which offers less storage but faster access than the main memory 122.

A respective level of cache memory in the system 100 may be inclusive or non-inclusive with respective to another level of cache memory (e.g., an adjacent level of cache memory) in the system 100. When a first level of cache memory is inclusive with respect to a second level, a cache line in the first level is guaranteed to also be in the second level. When a first level of cache memory is non-inclusive with respect to a second level, a cache line in the first level is not guaranteed to also be in the second level. One example of non-inclusive cache memory is exclusive cache memory. When a first level of cache memory is exclusive with respect to a second level, a cache line in the first level is guaranteed not to be in the second level.

For example, if an L2 cache 110 is inclusive with respect to the L3 cache 112, a cache line in the L2 cache 110 is guaranteed to also be in the L3 cache 112. If an L2 cache 110 is non-inclusive with respect to the L3 cache 112, a cache line in the L2 cache 110 is not guaranteed to also be in the L3 cache 112. If an L2 cache 110 is exclusive with respect to the L3 cache 112, a cache line in the L2 cache 110 is guaranteed not to be in the L3 cache 112.

The system 100 is merely an example of a system with a multi-level memory configuration; other configurations are possible. For example, the number of processor cores per processing module 102 may vary. More than two processor cores may share an L2 cache 110, or each processor core 104-0 and 104-1 may have its own L2 cache 110. Other examples are possible.

Figure 2:
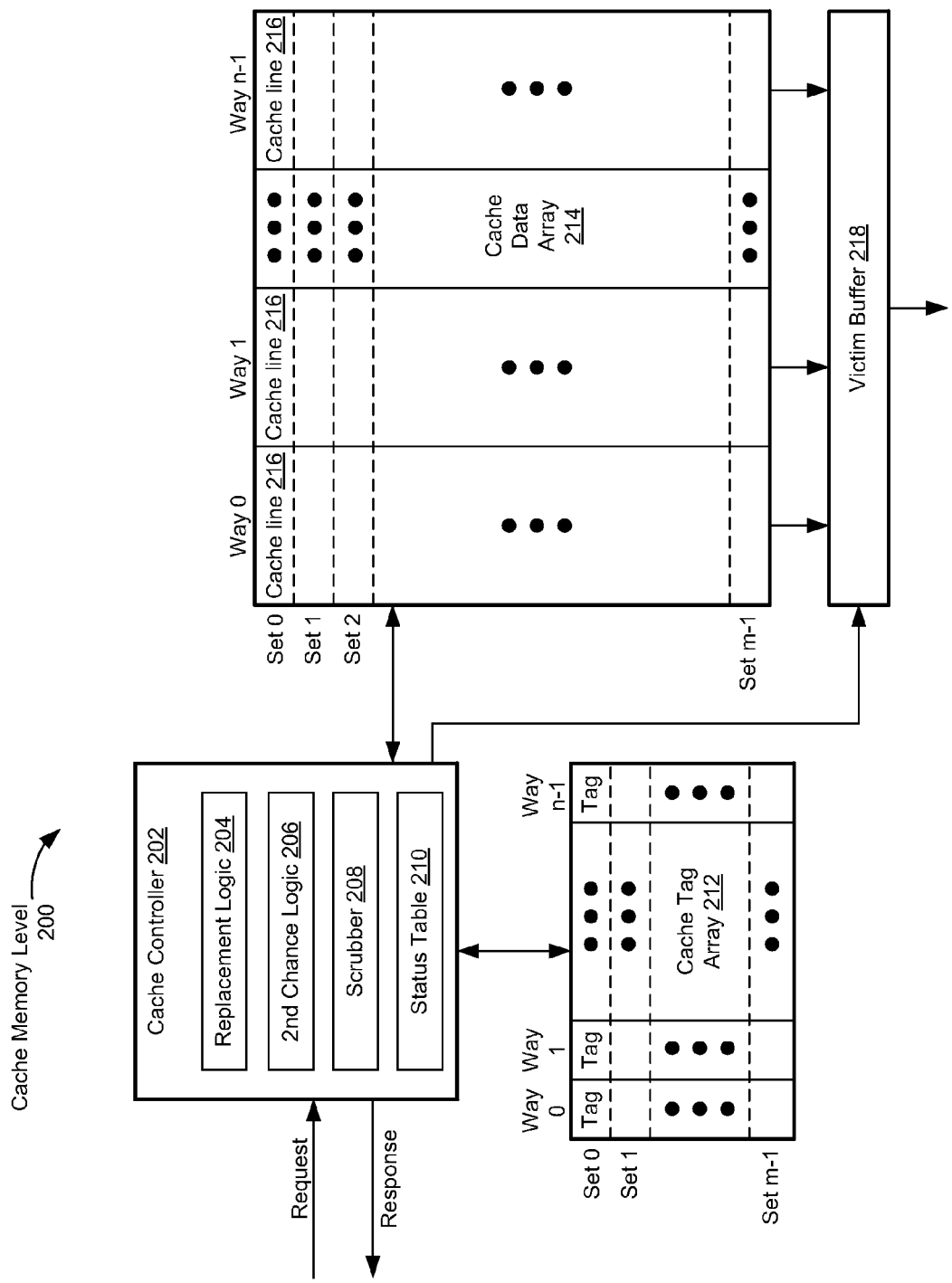
FIG. 2 is a block diagram of a level of cache memory in accordance with some embodiments.

FIG. 2 is a block diagram of a level 200 of cache memory in accordance with some embodiments. The level 200 is a particular level of cache memory (e.g., the L3 cache 112, an L2 cache 110, or an L1 cache 106 or 108, FIG. 1) in a system such as the system 100 (FIG. 1). The cache memory 200 includes a cache data array 214 and a cache tag array 212. (The term data as used in the context of the cache data array 214 may include instructions as well as data to be referenced when executing instructions.) A cache controller 202 is coupled to the cache data array 214 and cache tag array 212 to control operation of the cache data array 214 and cache tag array 212.

Addresses for data cached in respective cache lines 216 in the cache data array 214 are divided into multiple portions, including an index and a tag. Cache lines 216 are installed in the cache data array 214 at locations indexed by the index portions of the addresses, and tags are stored in the cache tag array 212 at locations indexed by the index portions of the addresses. (A cache line 216 may correspond to a plurality of addresses that share common index and tag portions.) These addresses are typically physical addresses, but in some embodiments may be virtual addresses. To perform a memory access operation in the level 200 of cache memory, a memory access request is provided to the cache controller 202 (e.g., from a processor core 104-0 or 104-1, or from a higher level of cache memory in the system 100, FIG. 1). The memory access request specifies an address. If a tag stored at a location in the cache tag array 212 indexed by the index portion of the specified address matches the tag portion of the specified address, then a cache hit occurs. Otherwise, a cache miss occurs. For a read request that results in a cache hit, the cache line 216 at a corresponding location in the cache data array 214 is returned in response to the request. For a write request that results in a cache hit, the cache line 216 at the corresponding location in the cache data array 214 is modified.

The cache data array 214, and thus the level 200 of cache memory, is set-associative: for each index, it includes a set of n locations at which a particular cache line 216 may be installed, where n is an integer greater than one. The cache data array 214 is thus divided into n ways, numbered 0 to n−1; each location in a given set is situated in a distinct way. Examples of n include, but are not limited to, eight and 16 (i.e., eight ways and 16 ways, respectively). The cache data array 214 includes m sets, numbered 0 to m−1, where m is an integer greater than one. The sets are indexed by the index portions of addresses. The cache tag array 212 is similarly divided into sets and ways.

A new cache line 216 to be installed in the cache data array 214 thus may be installed in any way of the set specified by the index portion of the addresses corresponding to the cache line 216. If all of the ways in the specified set already have valid cache lines 216, then a cache line 216 may be evicted from one of the ways and the new cache line 216 installed in its place. The evicted cache line 216, which is referred to as the victim cache line 216, may be selected for eviction based on a replacement policy (e.g., a least-recently-used (LRU) replacement policy, least-frequently-used (LFU) replacement policy, or other replacement policy). If write-back is to be performed (e.g., because the evicted cache line 216 is modified or because the level 200 of cache memory 200 is non-inclusive with respect to a lower-level cache memory), the victim cache line 216 is placed in a victim buffer 218, from where it is written back to a lower-level cache memory (or to main memory 122) in the system 100 (FIG. 1).

Figure 3:
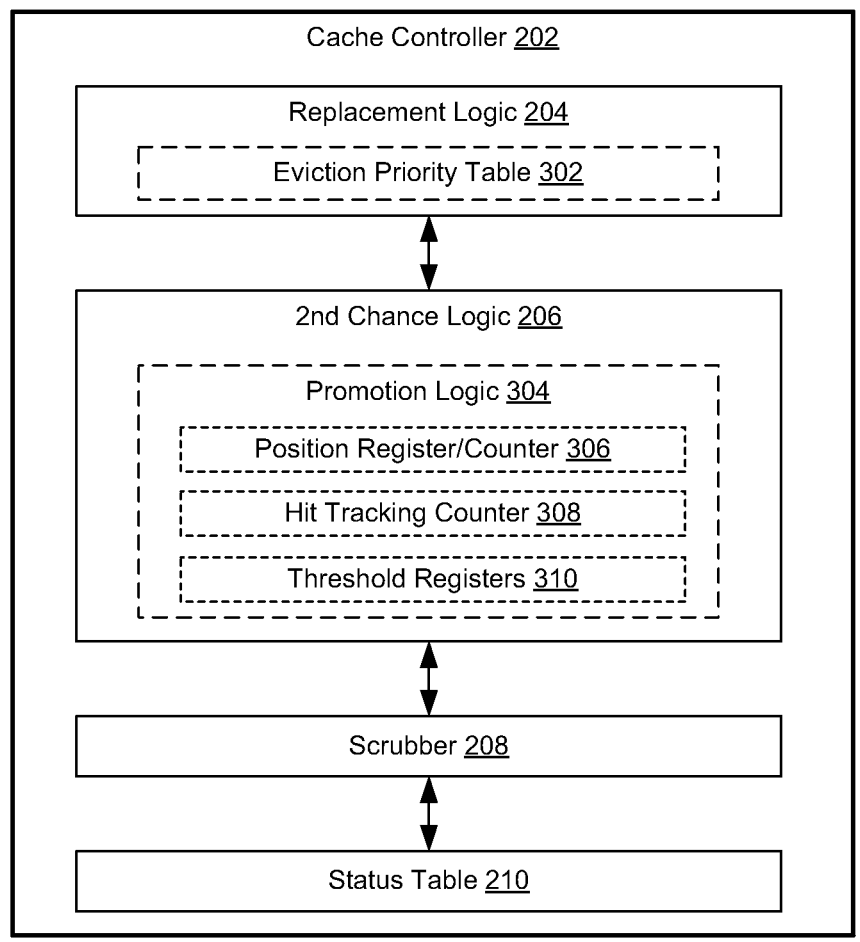
FIG. 3 is a block diagram of a cache controller in accordance with some embodiments.

The cache controller 202 includes replacement logic 204, second chance logic 206, a scrubber 208, and a status table 210. FIG. 3 shows the cache controller 202 in more detail in accordance with some embodiments.

The replacement logic 204 implements a replacement policy for selecting cache lines 216 in respective sets for eviction from the cache data array 214. The replacement logic 204 includes an eviction-priority table 302 that tracks eviction priorities for cache lines 216 in respective sets. The eviction priorities for the n cache lines 216 in a respective set range from a highest eviction priority to a lowest eviction priority for the respective set.

In the example of an LRU replacement policy, the eviction priorities for cache lines 216 in a set correspond to recency-of-usage positions for the cache lines 216 in the set. The recency-of-usage positions for the n cache lines 216 in a set range from most recently used (MRU), which is the lowest eviction priority in the set, to LRU, which is the highest eviction priority in the set. FIG. 4A shows a data structure for a recency-of-usage table 400 for an example in which the cache data array 214 is divided into eight ways (i.e., n=8), in accordance with some embodiments. The recency-of-usage table 400 is an example of an eviction-priority table 302 (FIG. 3). Each row 402 in the recency-of-usage table 400 corresponds to a respective set in the cache data array 214 and includes n entries 404-0 through 404-7. Each of the entries 404-0 through 404-7 in a row 402 stores a pointer to a distinct way, and thus to a distinct cache line 216, in the corresponding set. The entries 404-0 through 404-7 are ordered by recency-of-usage: entry 404-0 stores a pointer to the MRU cache line 216 in the corresponding set and entry 404-7 stores a pointer to the LRU cache line 216 in the corresponding set. The entries 404-0 through 404-7 specify an MRU-LRU chain (i.e., a recency-of-usage chain or simply a recency chain) for the corresponding set. The MRU-LRU chain is an example of an eviction-priority chain. Tables analogous to the recency-of-usage table 400 may be created for other types of replacement policies (e.g., for an LFU replacement policy).

Figure 5A:
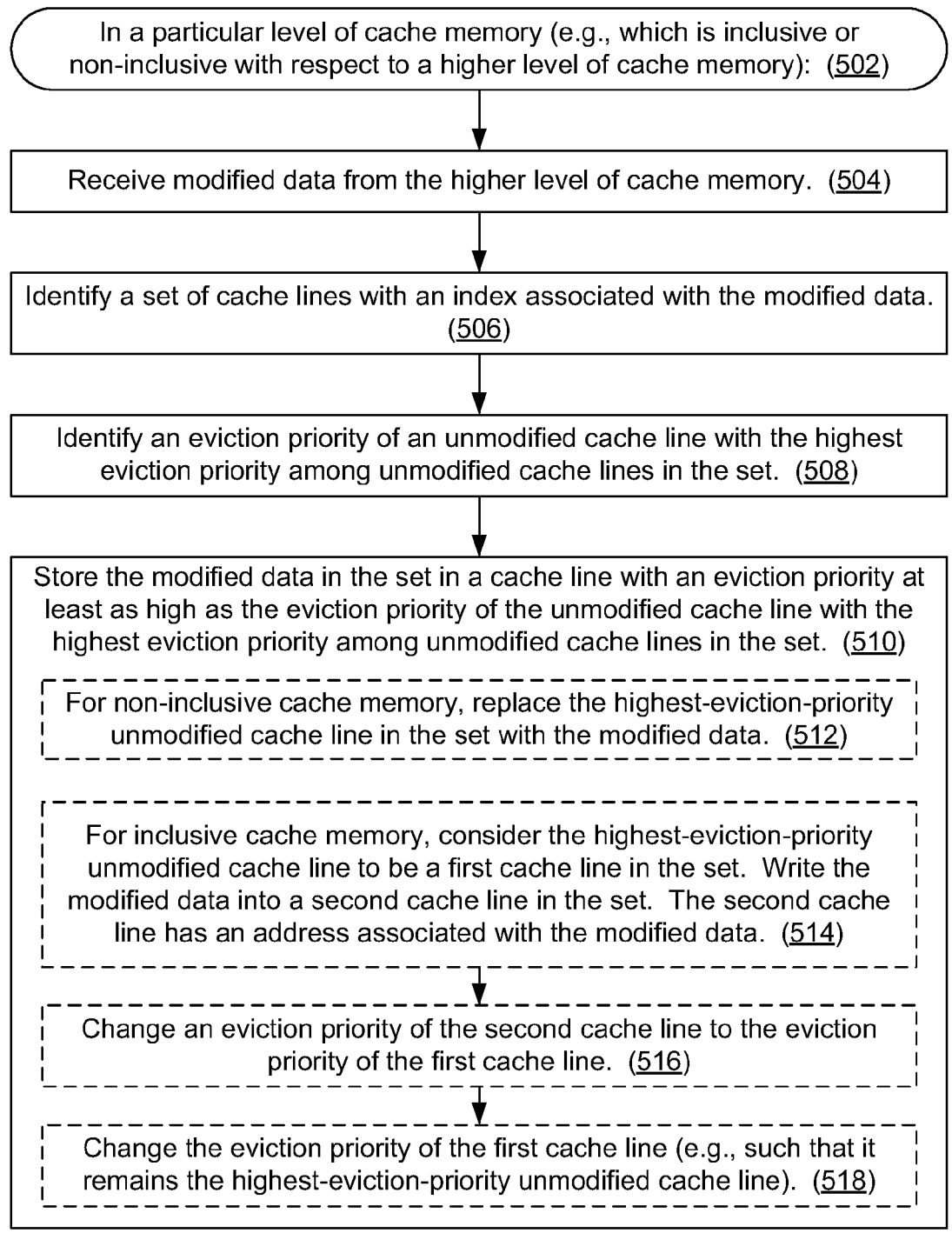
FIGS. 5A-5D are flowcharts showing methods of managing cache memory in accordance with some embodiments.

When the cache controller 202 receives a request (e.g., from a higher level of cache memory) to write modified data to the cache data array 214, the replacement logic 204 identifies a position, in the appropriate set, of a cache line 216 in which the modified data is to be stored. In some embodiments, this position is at or near the position of highest eviction priority (e.g., the LRU position or LFU position) for the set. For example, the highest eviction priority among unmodified cache lines 216 in the set (e.g., the position of the LRU or LFU unmodified cache line in the set) is chosen, as described in more detail below for the method 500 (FIG. 5A). Placing a modified cache line 216 in such a position, as opposed to the position of highest eviction priority (e.g., the MRU or most-frequently used (MFU) position) in its set, reduces the amount of time that the modified cache line 216 spends in the cache data array 214 before being evicted. The replacement logic 204 thus reduces the residency time of modified cache lines 216 in the cache data array 214, thereby reducing the number of modified cache lines 216 in the cache data array 214. The time consumed in flushing modified cache lines 216 before entering a low-power mode is reduced accordingly.

Figure 5B:
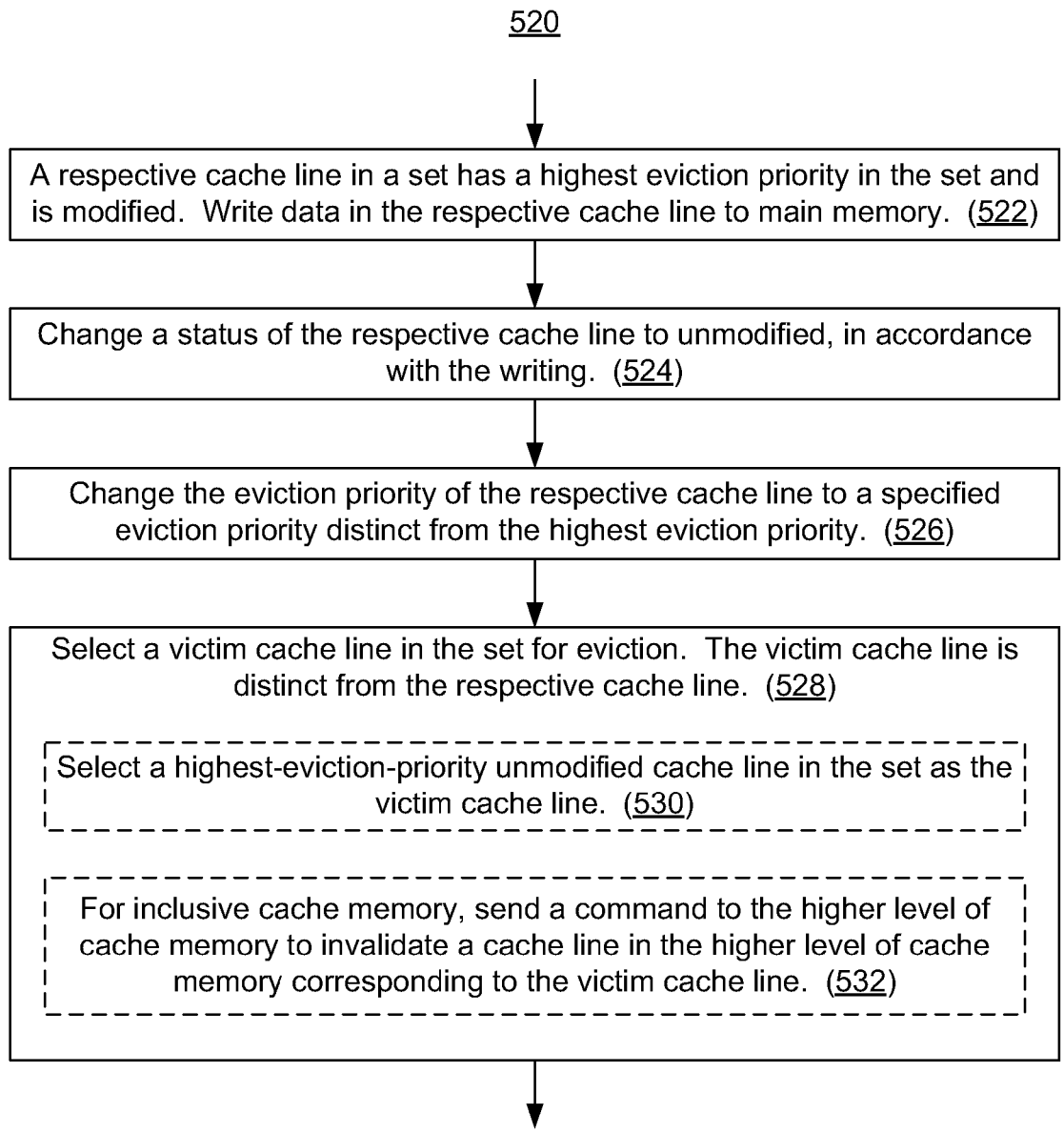
Figure 5C:
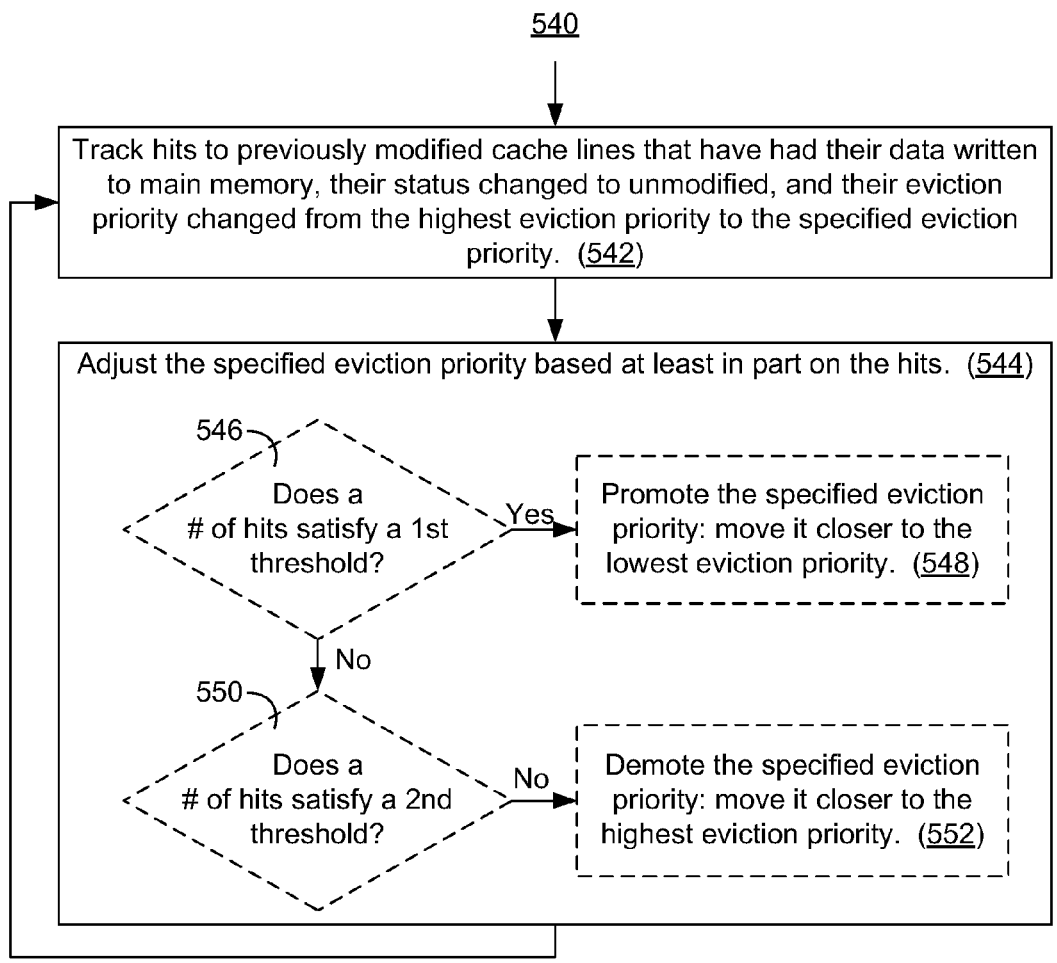
Figure 5D:
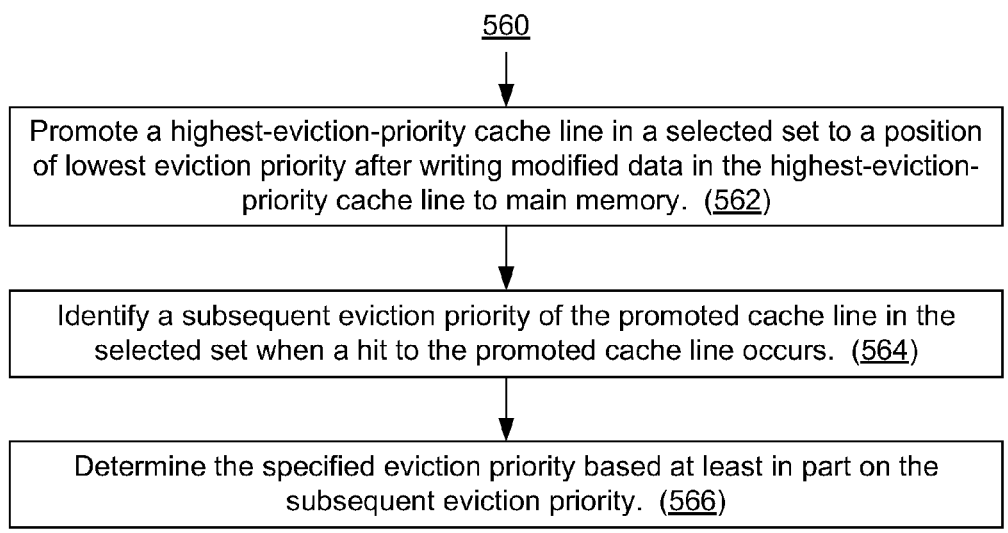

Placing modified cache lines 216 at or near the position of highest eviction priority (e.g., the LRU or LFU position) in their sets, however, may result in overly aggressive eviction of modified cache lines 216 that decreases the hit rate for the level 200 of cache memory. The cache controller 202 therefore includes second chance logic 206 to implement a second-chance policy for modified cache lines 216. If a modified cache line 216 is in the LRU position of its set when a cache line 216 is to be evicted from the set, the modified cache line 216 is not evicted. Instead, its data is written back to memory (e.g., to main memory 122, FIG. 1), its status is changed to indicate that it is no longer modified, and it is promoted to a specified eviction priority (e.g., a higher recency-of-usage position or frequency-of-usage position) for the set. Another cache line 216 in the set is chosen for eviction. This second-chance policy is described in more detail below for the method 520 (FIG. 5B). In some embodiments, the specified position to which the modified cache line 216 is promoted is dynamically configurable, as controlled by promotion logic 304 in the second-chance logic 206. The promotion logic 304 includes a position register 306 (e.g., implemented as a counter that varies between 0 and n−1) to store the specified position, and thus the specified eviction priority, for promotion. The promotion logic 304 may also include a hit tracking counter 308 that tracks hits to promoted cache lines 216 and threshold registers 310 storing threshold values to which the value in the hit tracking counter 308 may be compared. The value in the position register 306 may be dynamically adjusted in accordance with this comparison. Examples of this dynamic adjustment are described below in the methods 540 and 560 (FIGS. 5C-5D).

In some embodiments, the cache controller 202 includes a scrubber 208. The scrubber 208 is a hardware engine that controls operation of the second-chance logic 206. The scrubber 208 coordinates operation of the second-chance policy by walking the cache data array 214 and checking for modified cache lines 216 with the lowest eviction priority (e.g., in LRU or LFU positions) in their sets. The scrubber 208 operates in the background (e.g., such that it does not contend with access requests received by the cache controller 202).

The cache controller 202 includes a status table 210 that stores status information for the cache lines 216 in the cache data array 214. Each entry in the status table 210 corresponds to a distinct cache line 216. The entries are indexed, for example, by set and way. FIG. 4B shows an example of an entry 420 in the status table 210. The entry 420 includes a status field 424 that indicates whether the corresponding cache line is modified. If the level 200 of cache memory is cache coherent, the possible values of the status field 424 are specified by the cache coherence protocol. For example, possible status field values for an MSI cache coherence protocol are modified, shared, and invalid. Possible status field values for a MESI cache coherence protocol are modified, exclusive, shared, and invalid. Possible status field values for a MOESI cache coherence protocol are modified, owned, exclusive, shared, and invalid. These are merely some examples of status field values for cache coherence protocols; other examples are possible. In these examples, a status of shared, exclusive, and/or owned indicates that data in a cache line 216 is unmodified. A status of modified indicates that data in the cache line 216 is modified. A status of invalid indicates that the cache line 216 is empty. If the level 200 of cache memory is not cache coherent, the status field 424 stores a dirty bit and a valid bit. The dirty bit is asserted when the data in the cache line 216 is modified and is de-asserted when the data in the cache line 216 is unmodified. The valid bit indicates whether the cache line 216 is valid or invalid (i.e., empty).

Each entry 420 may also include a second-chance bit 426, which is set when the second-chance logic 206 promotes a modified cache line 216 from the position of lowest eviction priority (e.g., LRU or LFU position). Because this promotion is accompanied by writing the modified data to memory (e.g., to main memory 122, FIG. 1), the cache line 216 is no longer considered modified and its status field 424 is updated accordingly. Setting the second-chance bit 426 in conjunction with this promotion allows subsequent hits to promoted cache lines to be tracked (e.g., in the hit tracking counter 308). In some embodiments, the second-chance bit 426 for a modified cache line 216 is asserted/set (e.g., to '1') when the cache line 216 is promoted from the position of lowest eviction priority and is de-asserted/reset (e.g., to '0') when a hit to the cache line 216 subsequently occurs. When a hit to a cache line 216 with an asserted second-chance bit 426 occurs, the hit tracking counter 308 is incremented. Resetting the second-chance bit 426 in response to a first hit after promotion prevents the tracking of statistics regarding hits to promoted cache lines 216 from being skewed by a large number of hits to a single promoted cache line 216, and thus prevents unwarranted adjustment of the promotion position by the promotion logic 304.

In some embodiments, the second-chance bit 426 and/or the information in the status field 424 are stored in specified bits in the tags or in the cache lines 216 instead of in a status table 210.

Attention is now directed to methods of managing cache memory.

FIG. 5A is flowchart showing a method 500 of managing cache memory in accordance with some embodiments. The method 500 is performed (502) in the level 200 (FIG. 2) of cache memory, which is a particular level of cache memory in a system such as the system 100 (FIG. 1). The level 200 may be inclusive or non-inclusive (e.g., exclusive) with respect to a higher level of cache memory. In some embodiments, the level 200 is an LLC. In some embodiments, the level 200 is the L3 cache 112 and the higher level of cache memory is an L2 cache 110 (FIG. 1).

In the method 500, modified data is received (504) from the higher level of cache memory. For example, the modified data is being written back from a cache line in the higher level of cache memory and is provided to the level 200 in a write-back request.

A set of cache lines 216 is identified (506) with an index associated with the modified data. For example, the modified data has an address (or set of addresses) with an index portion that indexes the set in the cache data array 214.

In some embodiments, an eviction priority of an unmodified cache line 216 with the highest eviction priority among unmodified cache lines in the set is identified (508). For example, a recency-of-usage position of the LRU unmodified cache line in the set is identified, or a frequency-of-usage position of the LFU unmodified cache line in the set is identified. This eviction priority is identified, for example, based on information in the eviction-priority table 302 (FIG. 3) and the status table 210 (FIGS. 2, 3, and 4B). If the highest-eviction-priority cache line 216 (e.g., the LRU cache line 216, as identified by a pointer in entry 404-7, FIG. 4A) in the set is unmodified (e.g., as specified in the status field 424, FIG. 4B), then the identified position is the position of highest eviction priority (e.g., the LRU position). If not, successive positions in the eviction-priority chain for the set are examined in order of decreasing eviction priority (e.g., in order of increasing recency-of-usage, from entry 404-7 toward entry 404-0, FIG. 4A) until an unmodified cache line 216 is found. The eviction priority of that unmodified cache line 216 becomes the identified eviction priority (e.g., the identified recency-of-usage or frequency-of-usage position).

The modified data is stored (510) in a cache line 216 with an eviction priority at least as high as the eviction priority of the unmodified cache line with the highest eviction priority among unmodified cache lines in the set (i.e., as the highest-eviction-priority unmodified cache line). For example, the modified data is stored in a cache line 216 with the identified eviction priority in the set. Alternatively, the modified data is stored in the highest-eviction-priority cache line 216 in the set.

In some embodiments, if the level 200 of cache memory is non-inclusive (e.g., is exclusive) with respect to the higher level of cache memory, the highest-eviction-priority (e.g., LRU or LFU) unmodified cache line 216 in the set is evicted from the set and replaced (512) with the modified data. A new cache line 216 containing the modified data is thus installed in the set at the position of the highest-eviction-priority unmodified cache line 216.

If the level 200 of cache memory is inclusive with respect to the higher level of cache memory, the modified data is written (514) into a second cache line 216 in the set. The second cache line 216 may be distinct from the highest-eviction-priority unmodified cache line 216, which is considered to be a first cache line 216 in the set. (The terms first and second in this context are arbitrary labels and do not imply that each cache line 216 is situated in any particular way in the set.) The second cache line 216 has an address (e.g., a tag address) associated with the modified data. For example, the second cache line 216 is the unmodified equivalent of the cache line in the higher level of cache memory that provided the modified data. The second cache line 216 becomes modified when the write operation is performed. An eviction priority (e.g., a recency-of-usage position or frequency-of-usage position) of the second cache line 216 is changed (516) to the eviction priority of the first cache line 216, and the eviction priority of the first cache line 216 is changed (518) accordingly (e.g., such that it remains the highest-eviction-priority unmodified cache line). For example, the recency-of-usage (or frequency-of-usage) position of the first cache line 216 is shifted up (i.e., promoted) by one in the MRU-LRU (or MFU-LFU) chain for the set, and recency-of-usage (or frequency-of-usage) positions for other cache lines 216 in the set are shifted accordingly. In some embodiments, the operations 516 and 518 are performed by changing the pointers in respective ones of the entries 404-0 through 404-7 in the row 402 that corresponds to the set in the recency-of-usage table 400 (FIG. 4A) or an analogous table for another replacement policy.

FIG. 5B is a flowchart showing a method 520 of implementing a second-chance policy in a cache memory in accordance with some embodiments. The method 520 may be performed along with (e.g., as a continuation of) the method 500 (FIG. 5A) in the level 200 (FIG. 2) of cache memory.

In the method 520, a respective cache line 216 in a set (e.g., the set identified in the operation 506, FIG. 5A) has a highest eviction priority (e.g., is in an LRU or LFU position) for the set and is modified. Data in the respective cache line 216 is written (522) to main memory 122 (FIG. 1). A status of the respective cache line 216 is changed (524) to unmodified, in accordance with the writing: because the data in the respective cache line 216 has been written to main memory 122, the respective cache line 216 is no longer modified. In some embodiments, the status is changed by changing the value in the status field 424 (FIG. 4B). An eviction priority (e.g., a recency-of-usage position or frequency-of-usage position) of the respective cache line 216 (e.g., as specified in the eviction-priority table 302, FIG. 3) is changed (526) to a specified eviction priority distinct from the highest eviction priority. For example, the respective cache line 216 is promoted from the LRU (or LFU) position to a higher position in the MRU-LRU (or MFU-LFU) chain for the set, and therefore is given a second chance before being evicted from the level 200 (FIG. 2) of cache memory. Eviction priorities (e.g., positions in the MRU-LRU or MFU-LFU chain) of other cache lines 216 in the set are adjusted accordingly. In some embodiments, when the respective cache line 216 is promoted in the operation 526, its second chance bit 426 (FIG. 4B) is set.

In some embodiments, the operations 522, 524, and 526 are performed by the scrubber 208 (FIGS. 2 and 3).

In some embodiments, the method 520 further includes selecting (528) a victim cache line 216 in the set for eviction. The victim cache line is distinct from the respective cache line 216 of the operations 522, 524, and 526. For example, a highest-eviction-priority unmodified cache line 216 in the set is selected (530) as the victim cache line 216. In some embodiments, if the level 200 of cache memory is inclusive with respect to the higher level of cache memory, a command is sent (532) to the higher level of cache memory to invalidate a cache line in the higher level of cache memory that corresponds to (e.g., is a copy of) the victim cache line 216.

In some embodiments, the operations 522, 524, 526 and 528 (e.g., including the operations 530 and/or 532) are performed in response to an incoming cache fill in the set: the victim cache line 216 selected in the operation 530 is evicted to make room in the set for the incoming cache fill.

In some embodiments, the specified eviction priority to which the eviction priority of the respective cache line 216 is changed (526) is the highest eviction priority (e.g., the MRU or MFU position) of the set, or another statically defined eviction priority in the set. Alternatively, the specified eviction priority is adjustable (e.g., dynamically configurable). FIGS. 5C and 5D are flowcharts showing methods 540 and 560 of dynamically adjusting the specified eviction priority used in operation 526.

The method 540 (FIG. 5C) involves tracking (542) hits to previously modified cache lines 216 in the cache data array 214 that have had their data written to main memory, their status changed to unmodified, and their eviction priority changed from the highest eviction priority to the specified eviction priority (e.g., in accordance with operations 522, 524, and 526 of the method 520, FIG. 5B). This tracking is performed, for example, based on the second-chance bit 426 (FIG. 4B). If a hit occurs on a cache line 216 for which the second-chance bit 426 is set, then the hit tracking counter 308 (FIG. 3) is incremented. The hit tracking counter 308 may be periodically reset to zero, such that hits to cache lines 216 with asserted second-chance bits 426 are tracking during successive specified time periods.

The specified eviction priority is adjusted (544) based at least in part on the hits. For example, it is determined (546) if a number of hits (e.g., during a specified time period) satisfies (e.g., is greater than, or greater than or equal to) a first threshold. If the first threshold is satisfied (546-Yes), the specified eviction priority is moved (548) closer to the lowest eviction priority (e.g., by one position) and thus is promoted. If the first threshold is not satisfied (546-No), then it is determined (550) if a number of hits (e.g., during the specified time period) satisfies (e.g., is greater than, or greater than or equal to) a second threshold. If the second threshold is not satisfied (550-No) (i.e., if the number of hits is less than, or less than or equal to, the second threshold), then the specified position is moved (552) closer to the highest eviction priority (e.g., by one position) and thus is demoted. Promotion and demotion of the specified eviction priority are performed by updating the value stored in the position register 306 (FIG. 3). For example, if the position register 306 is implemented as a counter, the specified eviction priority is promoted or demoted by decrementing or incrementing the counter. The first and second thresholds may be stored in the threshold registers 310 (FIG. 3). The order of the operations 546 and 550 may be reversed.

By adjusting the specified eviction priority to which modified highest-eviction-priority cache lines 216 are promoted in accordance with the second-chance policy, the method 540 adjusts the amount of time that such cache lines 216 spend in the cache data array 214. The tracked number of hits provides an indication of the likelihood that such cache lines 216 will be accessed before eviction. The method 540 thus bases its adjustment of the amount of time that such cache lines 216 spend in the cache data array 214 on this indication. However, the method 540 can result in a feedback loop that causes excessive adjustment of the specified eviction priority. Demoting (i.e., increasing) the specified eviction priority causes modified cache lines 216 to spend less time in the cache data array 214, which results in fewer hits, which results in further demotion of the specified eviction priority. A similar effect may occur for promotion (i.e., for decreasing the eviction priority).

The method 560 (FIG. 5D) may be used in conjunction with, or as an alternative to, the method 540, to mitigate or avoid this feedback. In the method 560, a highest-eviction-priority cache line 216 in a selected set is promoted (562) to the lowest eviction priority in the selected set after modified data in the highest-eviction-priority cache line is written to main memory 122 (FIG. 1). The promoted cache line will not stay in the lowest-eviction-priority position, however. Its eviction priority in its set will change over time in accordance with operation of the level 200 of cache memory. A subsequent eviction priority of the promoted cache line in the selected set is identified (564) when a hit to the promoted cache line occurs. The specified eviction priority is determined (566) based at least in part on the subsequent eviction priority. For example, a specified eviction priority that has been adjusted in accordance with the method 540 (FIG. 5C) is reset to the subsequent eviction priority identified in the operation 564.

In some embodiments, the method 560 is performed repeatedly (e.g., for a predetermined subset of cache lines 216, or for a randomly selected subset of cache lines 216) and the specified eviction priority is determined based on the subsequent eviction priorities identified (564) in the iterations of the method 560. For example, an average, minimum, or maximum value of the subsequent eviction priorities is used for the specified eviction priority.

The methods 540 and 560 are merely two examples of how to set the specified eviction priority; others are possible. For example, the specified eviction priority may be periodically reset to a defined eviction priority (e.g., a defined position in the MRU-LRU or MFU-LFU chain). In another example, the level 200 of memory may include shadow tags, which are tags that would have been stored in the cache tag array 212 for a different replacement policy (e.g., in which modified cache lines are placed in the lowest-eviction-priority position of their sets). The specified position may be determined based on hits to the shadow tags.

While the methods 500, 520, 540, and 560 include a number of operations that appear to occur in a specific order, it should be apparent that the methods 500, 520, 540, and 560 can include more or fewer operations. An order of two or more operations may be changed, performance of two or more operations may overlap, and two or more operations may be combined into a single operation.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of managing cache memory, comprising:
   in a particular level of cache memory:
      receiving modified data from a higher level of cache memory;
      identifying a set of cache lines with an index associated with the modified data; and
      storing the modified data in the set in a cache line with an eviction priority that is at least as high as an eviction priority, before the storing, of an unmodified cache line with a highest eviction priority among unmodified cache lines in the set;
   wherein the unmodified cache line with the highest eviction priority among unmodified cache lines in the set is a first cache line in the set, and wherein storing the modified data comprises:
      writing the modified data into a second cache line in the set, the second cache line having a tag address associated with the modified data;
      changing an eviction priority of the second cache line to the eviction priority of the first cache line; and
      changing the eviction priority of the first cache line.

2. The method of claim 1, further comprising, before the storing, identifying the eviction priority of the unmodified cache line with the highest eviction priority among unmodified cache lines in the set.

3. The method of claim 1, wherein the unmodified cache line with the highest eviction priority among unmodified cache lines in the set comprises a least-recently-used (LRU) unmodified cache line in the set.

4. The method of claim 1, wherein:
   the particular level of cache memory is inclusive with respect to the higher level of cache memory.

5. The method of claim 1, wherein a respective cache line in the set has a highest eviction priority in the set and is modified, the method further comprising:
   writing data in the respective cache line to main memory;

changing a status of the respective cache line to unmodified, in accordance with the writing; and changing an eviction priority of the respective cache line to a specified eviction priority distinct from the highest eviction priority.

6. The method of claim 5, wherein:

writing the data, changing the status, and changing the eviction priority are performed in response to an incoming cache fill in the set; and the method further comprises, in response to the incoming cache fill, selecting a victim cache line in the set for eviction, wherein the victim cache line is distinct from the respective cache line.

7. The method of claim 6, wherein selecting the victim cache line comprises selecting the unmodified cache line with the highest eviction priority among unmodified cache lines in the set as the victim cache line.

8. The method of claim 5, further comprising:

tracking hits to previously modified cache lines in the particular level of cache memory that have had their data written to main memory, their status changed to unmodified, and their eviction priority changed from a highest eviction priority to the specified eviction priority; and adjusting the specified eviction priority based at least in part on the hits.

9. The method of claim 8, wherein adjusting the specified eviction priority comprises moving the specified position closer to a lowest eviction priority in response to a number of hits satisfying a first threshold.

10. The method of claim 8, wherein adjusting the specified eviction priority comprises moving the specified position closer to the highest eviction priority in response to a number of hits not satisfying a second threshold.

11. The method of claim 8, further comprising:

in a selected set of the particular level of cache memory, promoting a highest-eviction-priority cache line to a lowest eviction priority after writing modified data in the highest-eviction-priority cache line to main memory;

identifying a subsequent eviction priority of the promoted cache line in the selected set when a hit to the promoted cache line occurs; and determining the specified eviction priority based at least in part on the subsequent eviction priority.

12. A system, comprising:

a cache controller, to be coupled to a cache data array in a particular level of cache memory, to write modified data from a higher level of cache memory to a cache line in a set of cache lines in the cache data array, wherein:

the cache line has an eviction priority at least as high as an eviction priority, before the modified data is written, of an unmodified cache line with a highest eviction priority among unmodified cache lines in the set, wherein the unmodified cache line with a highest eviction priority among unmodified cache lines is a first cache line in the set, and wherein the cache controller writes the modified data into a second cache line in the set, the second cache line having an address associated with the modified data changes an eviction priority of the second cache line to the eviction priority of the first cache line; and changes the eviction priority of the first cache line; and the set has an index associated with the modified data.

13. The system of claim 12, further comprising at least one processor core.

14. The system of claim 13, wherein the at least one processor core comprises at least one of a central processing unit core, a graphics processor core unit, and a digital signal processor core unit.

15. The system of claim 12, wherein:

the particular level of cache memory is inclusive with respect to the higher level of cache memory.

16. The system of claim 12, wherein the cache controller comprises logic to:

write data in a respective cache line in the set to main memory, wherein the respective cache line has a highest eviction priority in the set and is modified;

change a status of the respective cache line to unmodified, in accordance with the data being written to main memory; and change the eviction priority of the respective cache line to a specified eviction priority distinct from the highest eviction priority.

17. The system of claim 16, wherein:

the logic to write the data, change the status, and change the eviction priority is responsive to an incoming cache fill in the set; and the cache controller further comprises logic to select a victim cache line in the set for eviction in response to the incoming cache fill, wherein the victim cache line is distinct from the respective cache line.

18. The system of claim 16, wherein the cache controller further comprises logic to adjust the specified eviction priority based at least in part on hits to previously modified cache lines in the particular level of cache memory that have had their data written to main memory, their status changed to unmodified, and their eviction priority reduced from a highest eviction priority for their respective sets.

19. A system, comprising:

means for identifying an eviction priority of an unmodified cache line with a highest eviction priority among unmodified cache lines in a set of cache lines in a particular level of cache memory, the set of cache lines having an index associated with modified data received from a higher level of cache memory; and means for storing the modified data in the set in a cache line with the identified eviction priority;

wherein the unmodified cache line with the highest eviction priority among unmodified cache lines in the set is a first cache line in the set, and wherein storing the modified data comprises:

writing the modified data into a second cache line in the set, the second cache line having a tag address associated with the modified data;

changing an eviction priority of the second cache line to the eviction priority of the first cache line; and changing the eviction priority of the first cache line.

* * * * *